(12) United States Patent
Zhao et al.

(10) Patent No.: US 9,473,459 B2
(45) Date of Patent: Oct. 18, 2016

(54) PEEL PLY, METHOD OF SURFACE PREPARATION AND BONDING COMPOSITE STRUCTURES USING THE SAME

(71) Applicant: Cytec Technology Corp., Wilmington, DE (US)

(72) Inventors: Yiqiang Zhao, Newark, DE (US); Dalip Kumar Kohli, Churchville, MD (US); Kunal Gaurang Shah, Gujarat (IN)

(73) Assignee: Cytec Technology Corp., Wilmington, DE (US)

( * ) Notice: Subject to any disclaimer, the term of this patent is extended or adjusted under 35 U.S.C. 154(b) by 856 days.

(21) Appl. No.: 13/678,595

(22) Filed: Nov. 16, 2012

(65) Prior Publication Data
US 2013/0129957 A1    May 23, 2013

Related U.S. Application Data

(60) Provisional application No. 61/582,096, filed on Dec. 30, 2011.

(51) Int. Cl.
*C09J 7/04* (2006.01)
*B32B 37/16* (2006.01)
(Continued)

(52) U.S. Cl.
CPC ........... *H04L 63/0272* (2013.01); *B32B 37/16* (2013.01); *C09J 7/041* (2013.01); *G06F 3/0482* (2013.01); *G06F 3/04842* (2013.01); *G06F 9/445* (2013.01); *G06F 9/455* (2013.01); *G06F 9/45558* (2013.01); *H04L 41/0853* (2013.01); *H04L 63/102* (2013.01); *H04L 63/105* (2013.01); *H04L 63/20* (2013.01); *H04M 1/72522* (2013.01); *H04M 1/72583* (2013.01); *H04W 4/001* (2013.01); *H04W 4/003* (2013.01); *H04W 12/06* (2013.01); *H04W 12/08* (2013.01);
(Continued)

(58) Field of Classification Search
None
See application file for complete search history.

(56) References Cited

U.S. PATENT DOCUMENTS

| 4,783,362 | A |  | 11/1988 | Thornton et al. |
| 5,879,492 | A | * | 3/1999 | Reis ........................ B32B 7/04 |
|  |  |  |  | 156/230 |

(Continued)

FOREIGN PATENT DOCUMENTS

| EP | 2103416 A2 | 9/2009 |
| WO | 2007127032 A2 | 11/2007 |

OTHER PUBLICATIONS

Q. Benard, M. Fois, M. Grisel. "Peel ply surface treatment for composite assemblies; Chemistry and morphology effects," Composites Part A: Applied Science and Manufacturing, 2005, 36, 11, 1562-1568.

(Continued)

*Primary Examiner* — Elizabeth M Cole
*Assistant Examiner* — Shawnda McKinnon
(74) *Attorney, Agent, or Firm* — Thi D. Dang

(57) ABSTRACT

A resin-rich peel ply that does not leave behind residual fibers after peeling and can work well with different resin-based composite substrates. The resin-rich peel ply is composed of a woven fabric impregnated with a resin matrix different from the resin matrix of the composite substrate. The peel ply is designed such that, upon manual removal of the peel ply from the composite substrate's surface, a thin film of the peel ply resin remains on the composite substrate's surface to create a bondable surface capable of bonding with another composite substrate, but no fibrous material from the woven fabric remains on the same surface.

16 Claims, 5 Drawing Sheets

(51) Int. Cl.
    *H04L 29/06*     (2006.01)
    *H04W 12/06*     (2009.01)
    *H04W 12/08*     (2009.01)
    *H04W 4/00*     (2009.01)
    *G06F 9/445*     (2006.01)
    *G06F 9/455*     (2006.01)
    *G06F 3/0482*     (2013.01)
    *G06F 3/0484*     (2013.01)
    *H04M 1/725*     (2006.01)
    *H04W 76/02*     (2009.01)
    *H04L 12/24*     (2006.01)
    *H04W 68/12*     (2009.01)

(52) U.S. Cl.
    CPC ............ *H04W 68/12* (2013.01); *H04W 76/02* (2013.01); *G06F 2009/45587* (2013.01); *G06F 2009/45595* (2013.01); *Y10T 428/14* (2015.01)

(56) References Cited

U.S. PATENT DOCUMENTS

2009/0107629 A1*   4/2009   Oguri .................... B24C 11/00
                                                                        156/279
2009/0229747 A1    9/2009   Olson et al.
2009/0239018 A1*   9/2009   Aijima ............... B29C 37/0067
                                                                        428/40.1

OTHER PUBLICATIONS

Q. Benard, M. Fois, M. Grisel. "Influence of fibre reinforcement and peel ply surface treatment towards adhesion of composite surfaces," International Journal of Adhesion and Adhesives, 2005, 25, 5, 404-409.

International Search Report. PCT/US2012/065389. Feb. 7, 2013.

* cited by examiner

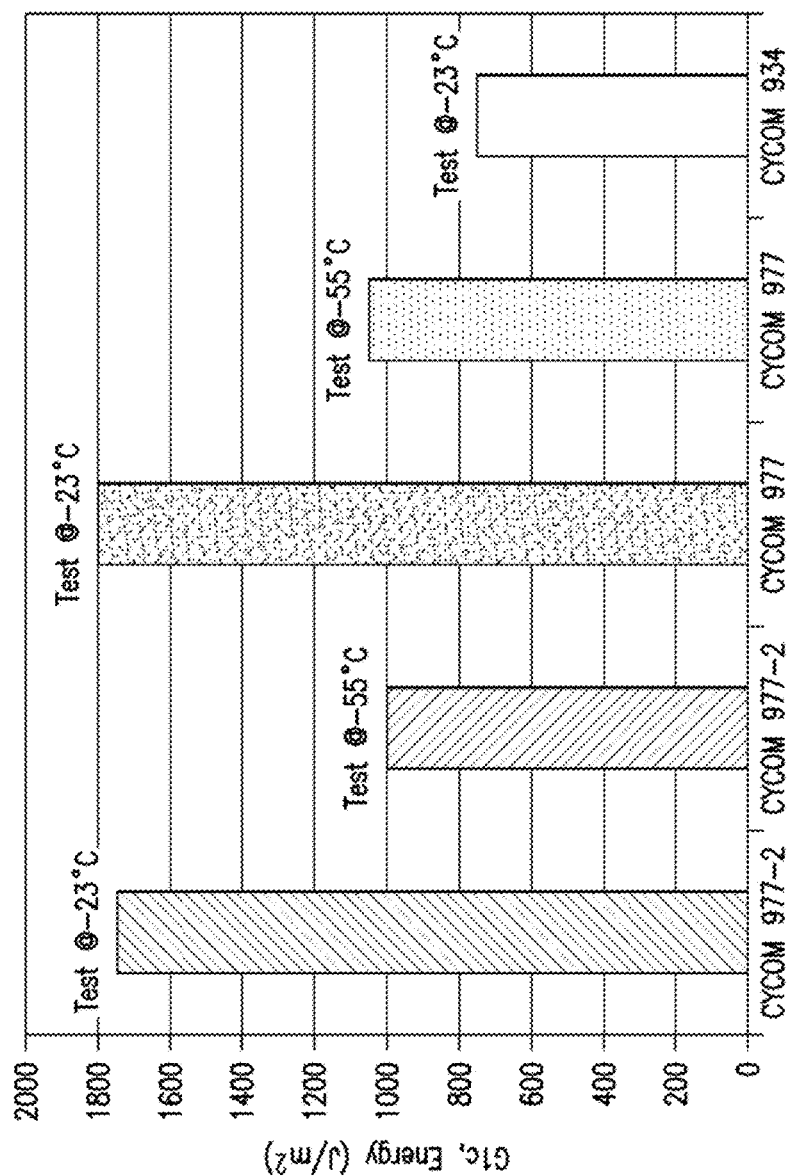

Co-bond side

Pre-cured side

US 9,473,459 B2

PEEL PLY, METHOD OF SURFACE PREPARATION AND BONDING COMPOSITE STRUCTURES USING THE SAME

This application claims the benefit of prior U.S. Provisional Application No. 61/582,096 filed on Dec. 30, 2011, which is incorporated herein in its entirety.

BACKGROUND

The present disclosure relates generally to peel plies for surface preparation of composite substrates, more particularly, resin-based composite substrates, prior to bonding.

Hand sanding, grit blasting and peel ply removal are conventional methods for preparing surfaces of resin-based composite substrates for adhesive bonding in aerospace industry. Adhesive bonding by peel ply removal is the most common out of the three techniques because it saves significant amount of labor and creates more evenly treated surface. Peel ply removal usually involves applying a dry, textured fabric material onto the bonding surface of the resin-based composite substrate followed by curing. After curing, the peel ply is removed, i.e. peeled off, to reveal a roughened or textured bonding surface. However, dry peel plies tend to leave residual broken fibers on the bonding surface after peeling. This leads to poor adhesive bonding properties because the residual fibers can act as defects that prevent the adhesive from completely wetting the bonding surface of the composite substrate, thereby resulting in adhesive failure. The general industry experience has been that the peel ply process lacks reliability and predictability with regard to bonding performance.

SUMMARY

The present disclosure provides a resin-rich peel ply that does not leave behind residual fibers after peeling and can work well with different resin-based composite substrates. The resin-rich peel ply is composed of a woven fabric impregnated with a resin matrix different from the resin matrix of the composite substrate. The peel ply is designed such that, upon manual removal of the peel ply from the composite substrate's surface, a thin film of the peel ply resin remains on the composite substrate's surface to create a bondable surface, but no fibrous material from the woven fabric remains on the same surface. This resin-rich peel ply is capable of modifying the surface of various composites for reliable bonding with a variety of adhesives. Hence, it could be considered as a "universal" peel ply.

The present disclosure also provides a method of preparing a surface for composite bonding using the peel ply discussed above. Also disclosed is a method for forming a bonded composite structure which includes: applying a peel ply onto a surface of a first composite substrate composed of fiber-reinforced resin; co-curing the peel ply and the first composite substrate; removing the peel ply from the first composite substrate leaving behind a thin layer of peel ply resin on the composite substrate's surface; applying an adhesive film onto at least one of the modified surface of the first composite substrate and a surface of a second composite substrate; contacting the modified surface of the first composite substrate with a surface of the second composite substrate with the adhesive film there between; and curing to bond the substrates.

BRIEF DESCRIPTION OF THE DRAWINGS

FIG. 6 shows the fracture toughness ($G_{1c}$) data for various adhesively bonded prepregs in an example.

DETAILED DESCRIPTION

Figure 1:
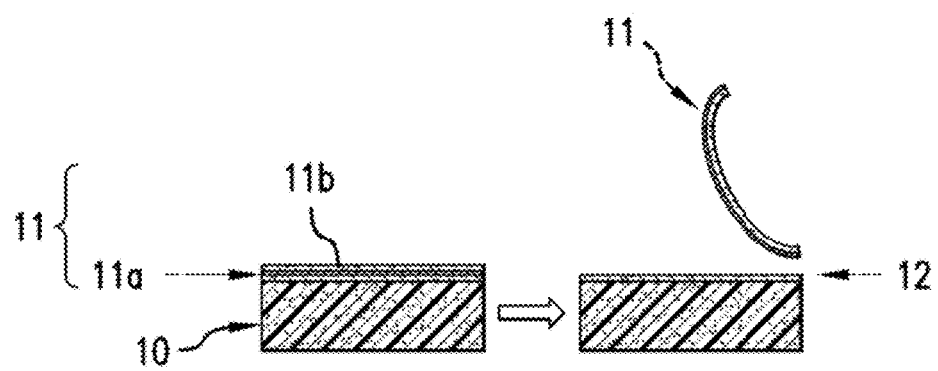
FIG. 1 schematically shows the working mechanism of the resin-rich peel ply according to the present disclosure.

It has been discovered that an advantage that may be realized in treating a fiber-reinforced resin composite substrate with a resin-rich peel ply to modify the surface of the treated composite substrate so as to facilitate and promote stronger and longer lasting bonding between the surface treated composite structure and a second composite substrate. The surface of the composite substrate (10) is modified by a thin resin film (12) remaining thereon after the resin-rich peel ply (11) is peeled off (FIG. 1). The working mechanism of the peel ply is illustrated by FIG. 1. The thickness of the remaining resin after the peel ply has been removed is about 2%-15% of the original thickness of the peel ply prior to peeling. This remaining peel ply resin layer provides a consistent surface layer for adhesive bonding, including co-bonding and secondary bonding. Co-bonding in composite bonding industry means bonding a cured prepreg with an uncured prepreg using adhesive. Secondary bonding means bonding a cured prepreg with another cured prepreg using adhesive. The rheology and cure kinetics of the peel ply resin are controlled to minimize intermingling between peel ply resin and the resin of the composite substrate during curing, whereby the peel ply resin formulation has a substantially faster curing kinetics than the resin formulation of the composite substrate. Because the resin-rich peel ply can be used with various fiber-reinforced resin composite substrates, it can be considered as a "universal" peel ply.

The fiber-reinforced resin composite substrates discussed herein include prepregs or prepreg layups conventionally used in the manufacturing of aerospace structural parts. The term "prepreg" as used herein refers to sheet or lamina of fibers that has been impregnated with a matrix resin. The matrix resin may be present in an uncured or partially cured state. The term "prepreg layup" as used herein refers to a plurality of prepreg layers that are placed adjacent one another in a stack. The prepreg layers within the layup may be positioned in a selected orientation with respect to one another. For example, prepreg layups may comprise prepreg layers having unidirectional fiber architectures, with the fibers oriented at 0°, 90°, a selected angle θ, and combinations thereof, with respect to the largest dimension of the layup, such as the length. It should be further understood that, in certain embodiments, prepregs may have any combination of fiber architectures, such as unidirectional and multi-dimensional.

Figure 2:
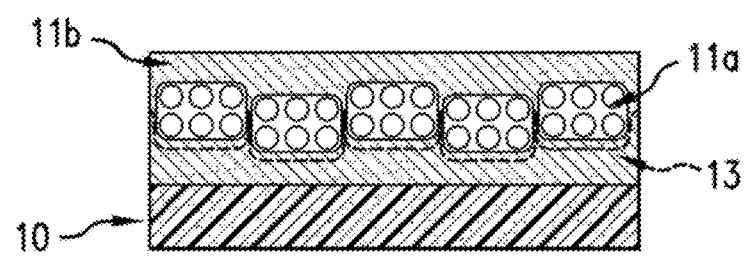
FIG. 2 shows the fracture line that occurs when the peel is removed from a composite substrate.

The resin-rich peel ply (11) of the present disclosure is composed of a woven fabric (11a) impregnated by a resin matrix (11b), as illustrated in FIG. 1, and has a resin content of at least 20% by weight based on the total weight of the peel ply, depending on the specific type of woven fabric being impregnated. In certain embodiments, the resin content is within the range of 20%-50%. The resin formulation and the fabric construction are selected such that no broken fibers are left on the composite substrate's surface after the peel ply has been removed. The fracture line (13) during peeling is within the resin matrix (11b) or at the fiber-resin interface, but not within the fabric (11a), as illustrated by FIG. 2. The resin-rich peel ply is easily removed from the composite substrate's surface after curing. To that end, it exhibits a peel strength of not greater than 10 in-lb/inch width-according to Drum Peel Test ASTM D1781.

The fabric of the resin-rich peel ply is composed of a plurality of yarns woven in a weaving pattern. Each yarn is composed of a plurality of continuous fibrous filaments (single fibers) twisted together. The woven fabric has a fabric weight within the range of 50-250 gsm (grams/m$^2$), preferably 70-220 gsm, and a thickness within the range of 50-250 μm, preferably 100-200 μm. Thickness is primarily a function of weight and fiber type, but it also depends on the weave the fiber type for the woven fabric may be selected from various synthetic materials including polyesters (polyethylene terephthalate, polybutylene terephthalate, polytrimethylene terephthalate, polylactic acid, and copolymers thereof), polyethylene, polypropylene, nylon, elastomeric materials such as LYCRA® and high-performance fibers such as the polyaramids (e.g. Kevlar), polyimides, polyethyleneimine (PEI), polyoxazole (e.g. Zylon polybenzimidazole (PBI), polyether ether ketone (PEEK), and glass. The main requirements for the fiber material are: the material is not brittle and has the required tensile strength. Furthermore, the fabrics may have a heat set finish or other conventional finishes.

The yarn size may be expressed in terms of linear mass density units of denier. Denier is equal to the weight in grams of 9000 meters of yarn. The lower the number, the finer the yarn. For a roll of fabric, the yarns that run in the direction of the roll and are continuous for the entire length of the roll are the warp yarns. The short yarns which run crosswise to the roll direction are called the fill yarns. For the resin-rich peel ply, the fabric is selected based on the following characteristics: warp yarns with linear mass density in the range or 50-250 deniers, preferably 70-230 deniers, and fill yarns with linear mass density in the range of 50-250, preferably 70-230 deniers, warp tensile strength of at least 70 lbf/in, preferably ≥80 lbf/in, fill tensile strength of at least 40 lbf/in, preferably ≥50 lbf/in. The weaving pattern is not limited and may be plain weave, twill weave, basket weave, satin weave and the like. The weaving density should not be too high for polymer-based fabric (i.e., tight weaving) such that low resin impregnation and incomplete impregnation of the yarns would result.

Figure 3:
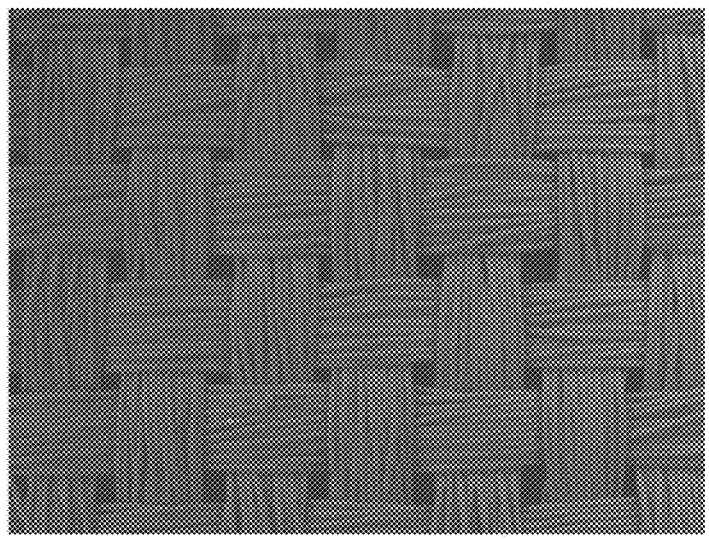
FIG. 3 is a scanning electron microscope (SEM) image of an exemplary polyester fabric that may be used for the resin-rich peel ply.
Figure 4:
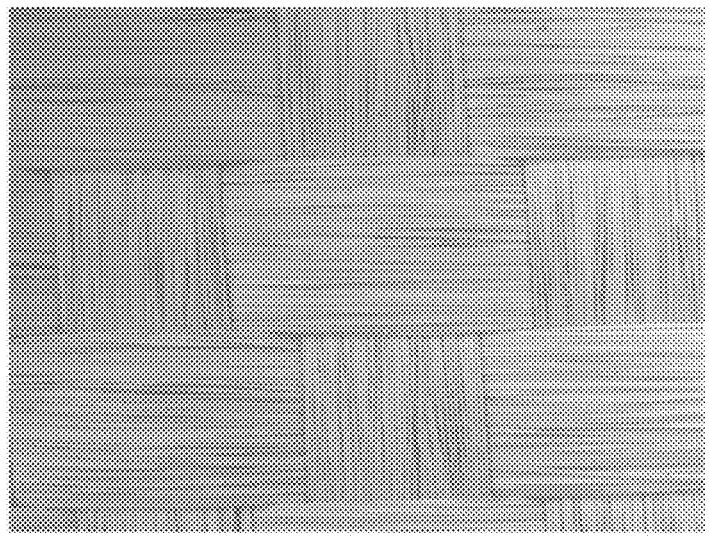
FIG. 4 is a scanning electron microscope (SEM) image of an exemplary glass fabric that may be used for the resin-rich peel ply.

FIG. 3 is a scanning electron microscope (SEM) image of an exemplary polyester fabric that may be used for the resin-rich peel ply. This particular fabric has a weight of 110 gsm and yarns with linear mass density of 125 deniers. As can be seen from FIG. 3, this type of polyester fabric is not tightly woven and contains tiny openings in the weaving. When the peel ply containing this type of polyester fabric is peeled off the composite surface, a resin film with a roughened surface and no broken fiber is produced. Such roughened surface is desirable for bonding. Tightly woven fabrics such as glass fabrics may also be used for forming the resin-rich peel ply to create a desirable surface roughness for composite bonding. FIG. 4 shows an exemplary glass fabric that may be used for the resin-rich peel ply. This glass fabric is more tightly woven and thicker than the polyester fabric shown in FIG. 3; it has a weight of 205 gsm and a thickness of 175 μm.

The resin matrix of the peel ply is formed from a curable resin composition which includes: at least one epoxidized novolac resin having epoxy functionality of at least 2; di-functional epoxy resin selected from diglycidyl ethers of polyhydric phenols: tri-functional epoxy resin selected from triglycidyl ethers of aminophenols; inorganic filler particles (e.g. fumed silica) and a curing agent. The epoxidized novolac resin is making up at least 40% by weight based on the total weight of the composition, preferably 50-70% by weight. The di-functional epoxy resin is present in amount of 0.10-35%, preferably 15-25% by weight, the tri-functional epoxy resin is present in an amount of 10-30%, preferably 10-20% by weight, based on the total weight of the resin composition.

Examples of epoxidized novolac resins include those obtained by reacting phenols such as phenol, o-cresol, m-cresol, p-cresol, p-tert-butylphenol, p-nonylphenol, 2,6-xylenol, resorcinol, bisphenol-A, α and β-naphthol, and naphthalenediol with aldehydes such as acetaldehyde, formaldehyde, furfural, glyoxal, and p-hydroxybenzaldehyde in the presence of an acid catalyst.

Suitable epoxidized novolac resins include epoxy phenol novolac resins and epoxy cresol novolac resins represented by the following Structure I:

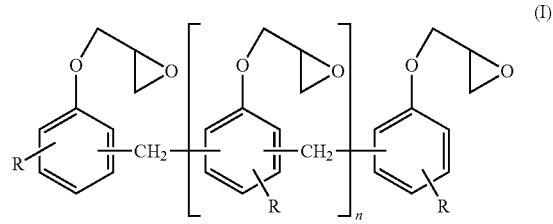

wherein n is an integer from 0 to 8, R=H or CH$_3$. When R=H, the resin is a phenol novolac resin. When R=CH$_3$, the resin is a cresol novolac resin. Epoxy phenol novolac resins are commercially available as DEN 428, DEN 431, DEN 438, DEN 439, and DEN 485 from Dow Chemical Co. Epoxy cresol novolac resins are commercially available as ECN 1235, ECN 1273, and ECN 1299 from Ciba-Geigy Corp.

Another suitable epoxidized novolac resin is hydrocarbon epoxy novolac resin having a dicyclopentadiene backbone represented by the following Structure II:

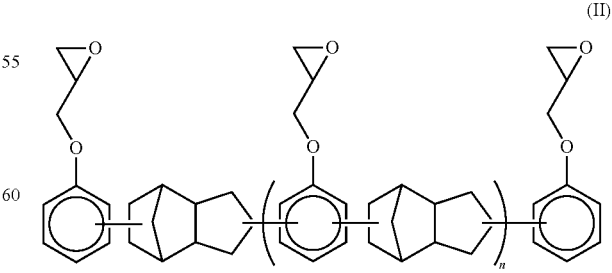

wherein n is an integer from 0 to 7. Commercial examples of such hydrocarbon epoxy novolac resins include as Tactix® 71756, Tactix® 556, and Tactix® 756 from Vantico Inc. In one embodiment, novolac resin of Structure I is used in conjunction with dicyclopentadiene-containing novolac resin of Structure II.

Suitable di-functional epoxy resins include diglycidyl ethers of bisphenol A or bisphenol F, e.g., Epon™ 828 (liquid epoxy resin), D.E.R. 331, D.E.R. 661 (solid epoxy resin) supplied by Dow Chemical Co.

Triglycidyl ethers of aminophenols are commercially available as Araldite® MY 0150, MY 0500, MY 0600, MY 0610 from Huntsman Advanced Materials.

Suitable curing agents for the epoxy resins in the peel ply resin composition include a class of curing agents known as Lewis Acids: trifluoroboride ($BF_3$), borontrichloride ($BCl_3$), and complexes thereof, such as $BF_3$-Amine complexes and $BCl_3$-Amine complexes. Examples of $BF_3$-Amine complexes include BF3-MEA from Ato-Tech, Anchor 1040 (BF3 complexed with benzyl amine and isopropyl amine) from Air Products, Anchor 1115 (BF3 complexed with isopropyl amine adduct) from Air Products, and Anchor 1170 (BF3 complexed with chlorobenzyl amine) also from Air Products. Examples of $BCl_3$-Amine complexes include Omincure™ BC-120. Complexes are made to provide liquid or solid forms under conditions of normal use. Many Commercially available epoxy-based prepregs include amine-based curing agents such as 3,3'-diaminodiphenylsulphone (DDS) and dicyandiamide (DICY), which show substantially slower curing kinetics than those of a peel ply resin formulation containing the above curing agents, e.g. $BF_3$ liquid. As a result, the peel ply resin formulation can cure fast enough to minimize the intermingling with the prepreg resin during co-curing process.

Inorganic fillers in particulate form (e.g. powder) are added to the peel ply resin composition as a rheology modifying component to control the flow of the resinous composition and to prevent agglomeration therein. Suitable inorganic fillers that may be used in the surface film composition include fumed silica, talc, mica, calcium carbonate, alumina. The amount of inorganic filler may be within the range of 1-10% by weight, preferably 1-5% by weight, based on the total weight of the surface film composition.

In an embodiment, the resin composition of the peel ply may include, in weight percentages based on the total weight of the resin composition: approximately 45-55% phenol novolac epoxy resin; approximately 5-15% dicyclopentadiene-containing novolac epoxy resin, approximately 20-30% diglycidyl ether of bisphenol A; approximately 15-25% triglycidyl ether of aminophenol; approximately 5-15% $BF_3$ curing agent, and approximately 1-5% inorganic filler.

Furthermore, one or more organic solvents may also be added to the resin composition described above, as necessary, to facilitate the mixing of the components. Examples of such solvents may include, but are not limited to, methyl ethyl ketone (MEK), acetone, dimethylacetamide, and N-methylpyrrolidone.

The resin-rich peel ply may be formed by coating the resin composition described above onto the woven fabric so as to completely impregnate the yarns in the fabric using conventional solvent or hot-melt coating processes. The wet peel ply is then allowed to dry if needed to reduce the volatile content, preferably, to less than 2% by weight. Drying may be done by air drying at room temperature overnight followed by oven drying at 140° F.-170° F., or by oven drying at elevated temperature as necessary to reduce the drying time. Subsequently, the dried resin-rich peel ply may be protected by applying removable release papers or synthetic films (e.g. polyester films) on opposing sides. Such release papers or synthetic films are to be removed prior to using the peel ply for surface bonding. The dried peel ply is applied onto a surface of an uncured (or partially cured) resin-based composite substrate, e.g. epoxy-based prepreg. Next, the peel ply together with the composite substrate is subject to co-curing. The peel ply is then removed to leave a thin resin film on the composite substrate, thereby forming a modified surface ready for adhesive bonding with another composite substrate.

For co-bonding and secondary bonding of two composite substrates, a curable adhesive film is applied onto at least one of the modified surface of a first composite substrate that is already cored and a surface of a second composite substrate. The modified surface of the first cured composite substrate is brought into contact with a surface of the second composite substrate such that the adhesive is between the substrates. Curing is then carried out to form a bonded composite structure. The terms "curing" and "cure" as used herein refer to polymerizing and/or cross-linking process which may be performed by heating, exposure to ultraviolet light, or radiation.

Co-curing of the resin-rich peel ply and the resin-based composite substrate (e.g. epoxy-based prepreg) may be carried out at temperatures greater than 230° F. (110° C.), more specifically, within the temperature range of 250° F.-375° F. (121° C.-190° C.). It has been discovered that an advantage of the resin-rich peel ply described herein is that peel ply can be co-cured with most commercially available prepregs within the above curing range. Such prepregs include resin pre-impregnated fabrics and/or tapes commercially available as CYCOM 997, CYCOM 977-2, CYCOM 934, CYCOM 970, CYCOM 5317-3, CYCOM 5320-1 and CYCOM 851 from Cytec Industries Inc.; Hexply 8552 from Hexed Corp.; and Toray 3900-2 from Toray Industries Inc. After co-curing, the cured resin-rich peel ply exhibits a glass transition temperature $(T_g) \geq 140°$ C., in some embodiments, 140° C.-200° C., as measured by Modulated Differential Scanning calorimetry (DSC) method.

EXAMPLES

The following examples are illustrative of some embodiments of the resin-rich peel ply disclosed herein and its application, and are not to be construed as limiting the scope of the present disclosure.

Example 1

A resin-rich peel ply was prepared by impregnating a polyester fabric with a resin formulation comprised of, in weight %: 45% phenol-formaldehyde novolac epoxy resin; 11% dicyclopentadiene-containing novolac epoxy resin: 23% diglycidyl ether of bisphenol A; 14% triglycidyl ether of aminophenol; 5% liquid $BF_3$, and 2% fumed silica. The polyester fabric had the following properties:

| Fabric Plain weave, polyester fibers | |
| --- | --- |
| Weight | 85 g/m² |
| Linear mass density | warp 150 denier; fill 150 denier |
| Tensile strength | warp 155 lbf/in; fill 120 lbf/in |
| Thickness | ~0.005 in |

The resin formulation was mixed using a hot-melt process followed by a solvent addition process. After a hot-melt mix was made, methyl ethyl ketone (MEK) solvent was added to the resin composition to form a 82% solid suspension. The wet resin composition was coated onto the fabric using, solvent coating, process and let dry overnight at room temperature followed by oven dry process to reduce the volatile content to less than 2%. The dried peel ply had a resin content of about 43% by weight and a thickness of about 140 μm.

Alternatively, the resin formulation may also be mixed with MEK in a solvent-assisted process at room temperature. The obtained wet resin mix at 82% solid content may be coated onto the fabric in the same way as described above.

Figure 5:
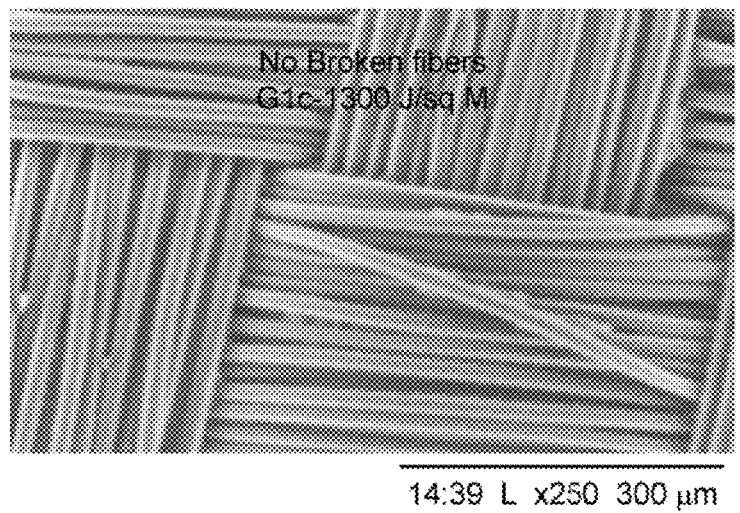
FIG. 5 is a scanning electron microscope (SEM) image of a treated surface after the resin-rich peel ply was removed.

The dried peel ply as discussed above was used to prepare the surface of a fiber-reinforced epoxy-based prepreg. CYCOM 997 tape from Cytec Industries Inc.). After co-curing at 177° C., the peel ply was peeled off leaving behind a modified surface ready for bonding. A Drum Peel test (ASTM D1781) was performed to evaluate the peel off strength of the peel ply. The test result indicated 11.1 Newton (2.5 in-lb/inch width). This shows that the peel ply was easily peeled off. Surface analysis by ATR-FTIR (Attenuated Total Reflection) was performed to study the treated surface of the prepreg after curing and removal of the peel ply. It was found that a thin layer of about 3-10 μm of peel ply resin was left on top of the prepreg. FIG. 5 is a scanning electron microscope (SEM) image of the treated surface after the resin-rich peel ply was removed, which shows that no broken fibers front the fabric remain.

Example 2

A resin-rich peel ply was fabricated by impregnating a polyester fabric with the following resin formulation, in weight %: 45% Phenol-formaldehyde novolac epoxy resin, 11% Dicyclopentadiene-containing novolac epoxy resin; 22.5% Diglycidyl ether of bisphenol A; 13.5% Triglycidyl ether of aminophenol; 6% $BF_3$-MEA; and 2% fumed silica. The fabric had the following properties:

| Fabric Plain weave, twisted, polyester fibers | |
|---|---|
| Weight | 110 g/m$^2$ |
| Linear mass density | warp 126 denier; fill 126 denier |
| Tensile strength | warp 105 lbf/in; fill 105 lbf/in |
| Thickness | ~0.0045 in |

The resin formulation was mixed, coated onto the fabric dried, and tested in the same way as in Example 1. Similar result was seen—a thin layer of about 3-10 μm of peel ply resin was left on top of the prepreg after the resin-rich peel ply was removed, but no broken fibers from the fabric remain.

Example 3

A resin-rich peel ply was prepared by impregnating a polyester fabric with a resin formulation comprised of, in weight %: 44.5% phenol-formaldehyde novolac epoxy resin; 9% dicyclopentadiene-containing novolac epoxy resin; 22% diglycidyl ether of bisphenol A; 18% triglycidyl ether of aminophenol; 4.7% liquid $BF_3$, and 1.8% fumed silica. The polyester fabric had the following properties:

| Fabric Plain weave, polyester fibers | |
|---|---|
| Weight | 85 g/m$^2$ |
| Linear mass density | warp 150 denier; fill 150 denier |
| Tensile strength | warp 155 lbf/in; fill 120 lbf/in |
| Thickness | ~0.005 in |

The resin formulation was mixed, coated onto the fabric, dried, and tested in the same way as in Example 1. Similar result was seen—a thin layer of about 3-10 μm of peel ply resin was left on top of the prepreg after the resin-rich peel ply was removed, but no broken fibers from the fabric remain.

Example 4

A resin-rich peel ply was prepared by impregnating a polyester fabric with a resin formulation comprised of, in weight %: 44% phenol-formaldehyde novolac epoxy resin; 9% dicyclopentadiene-containing novolac epoxy resin; 22% diglycidyl ether of bisphenol A; 17% triglycidyl ether of aminophenol; 6% $BF_3$-MEA, and 2% fumed silica. The polyester fabric had the following properties:

| Fabric Plain weave, twisted, polyester fibers | |
|---|---|
| Weight | 110 g/m$^2$ |
| Linear mass density | warp 126 denier; fill 126 denier |
| Tensile strength | warp 105 lbf/in; fill 105 lbf/in |
| Thickness | ~0.0045 in |

The resin formulation was mixed, coated onto the fabric, dried, and tested in the same was as in Example 1. Similar result was seen—a thin layer of about 3-10 μm of peel ply resin was let on top of the prepreg after the resin-rich peel ply was removed, but no broken fibers from the fabric remain.

Example 5

A resin-rich peel ply was prepared by impregnating a polyester fabric with a resin formulation comprised of, in weight %: 45.5% phenol-formaldehyde novolac epoxy resin; 11.4% dicyclopentadiene-containing novolac epoxy resin, 22.8% diglycidyl ether of bisphenol A; 13.7% triglycidyl ether of aminophenol; 4.8% liquid $BF_3$, and 1.8% fumed silica. The polyester fabric had the following properties:

| Fabric Plain weave, twisted, polyester fibers | |
|---|---|
| Weight | 110 g/m$^2$ |
| Linear mass density | warp 126 denier; fill 126 denier |
| Tensile strength | warp 105 lbf/in; fill 105 lbf/in |
| Thickness | ~0.0045 in |

The resin formulation was mixed, coated onto the fabric, dried, and tested in the same way as in Example 1. Similar result was seen—a thin layer of about 3-10 μm of peel ply resin was left on top of the prepreg after the resin-rich peel ply was removed, but no broken fibers from the fabric remain.

Example 6

A resin-rich peel ply was prepared by impregnating a glass fabric with a resin formulation comprised of, in weight %: 44.5% phenol-formaldehyde novolac epoxy resin; 8.9% dicyclopentadiene-containing novolac epoxy resin; 22.3% diglycidyl ether of bisphenol A; 17.8% triglycidyl ether of aminophenol; 4.7% liquid $BF_3$, and 1.8% fumed silica. The glass fabric had the following properties:

| Fabric Plain weave, glass fibers | |
|---|---|
| Weight | 207 g/m$^2$ |
| Tensile strength | warp 350 lbf/in; fill 260 lbf/in |
| Thickness | ~0.007 in |

The resin formulation was mixed, coated onto the fabric in the same way as in Example 1. After drying, the dried peel ply had a resin content of about 28% by weight and a thickness of about 195 μm. The resin-rich peel ply was then tested in the same way as Example 1. Similar result was seen—a thin layer of about 3-10 μm of peel ply resin was left on top of the prepreg after the resin-rich peel ply was removed, but no broken fibers from the fabric remain.

Example 7

A resin-rich peel ply was prepared by impregnating a polyester fabric with the resin formulation disclosed in Example 6. The polyester fabric had the following properties:

| Fabric Plain weave, twisted, polyester fibers | |
|---|---|
| Weight | 110 g/m$^2$ |
| Linear mass density | warp 126 denier; fill 126 denier |
| Tensile strength | warp 105 lbf/in; fill 105 lbf/in |
| Thickness | ~0.0045 in |

The resin formulation was mixed, coated onto the fabric, dried, and tested in the same way as in Example 1. Similar result was seen—a thin layer of about 3-10 μm of peel ply resin was left on top of the prepreg after the resin-rich peel ply was removed, but no broken fibers from the fabric remain.

Example 8

Double Overlap Shear Testing

CYCOM 970 prepregs (from Cytec Industries Inc.) were bonded to each other using a commercially available adhesive FM 318 M.05 psf (from Cytec Industries Inc.). Three to four bonded prepreg samples were tested at each test temperature. Prior to bonding, the bonding surface of the prepregs was prepared using the resin-rich peel ply as discussed in Example 1. Table 2 shows the average shear data at 23° C.-55° C. and 72° C. test temperatures based on Double Overlap Shear Testing (ASTM D3528). As seen in Table 2, the peel ply promotes cohesive failure at the various test temperatures.

TABLE 2

| Test Temperature | Average Shear (MPa) |
|---|---|
| 23° C. | 35.5 |
| −55° C. | 32.9 |
| 72° C. | 31.7 |

Example 9

Double Cantilever Beam Testing

Bonded prepreg samples were formed using various commercially available prepreg materials and a commercially available adhesive FM 309-1 (from Cytec Industries Inc.). Prior to bonding, the bonding surface of the prepregs was prepared using the resin-rich peel ply as discussed in Example 1. Double Cantilever Beam Testing (ASTM D5528) was carried out at 23° C. and −55° C. to measure the interlaminar fracture toughness ($G_{1c}$) of the bonded prepregs and the results are shown in FIG. 6.

Figure 7A:
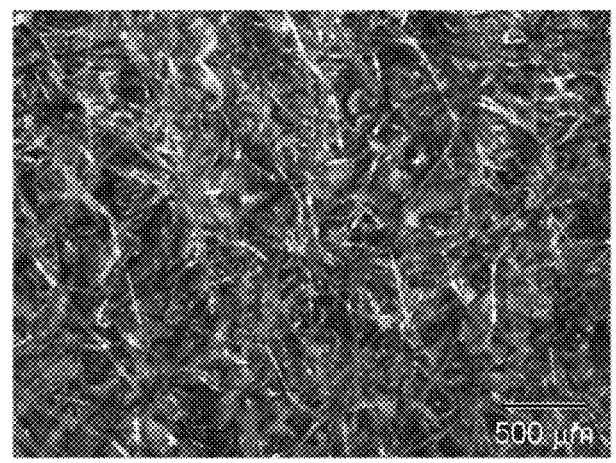
FIGS. 7A and 7B are optical microscope images showing the cohesive failure condition of co-bonded prepregs after fracture toughness ($G_{1c}$) testing according to one example.
Figure 7B:
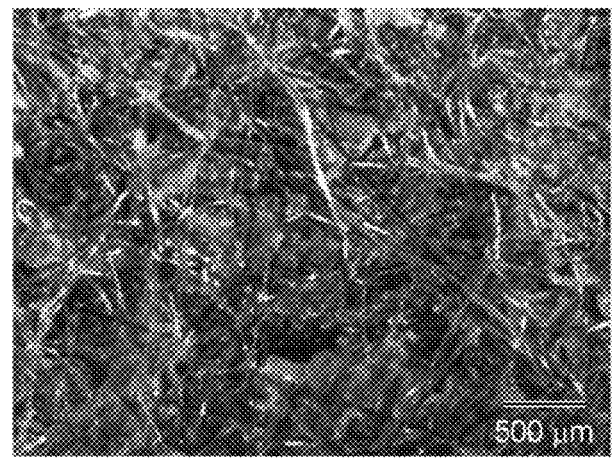

CYCOM 5317-6 prepregs (from Cytec Industries Inc.) were co-bonded using structural adhesive FM 309-1M.05 psf. Prior to co-bonding, a resin-rich peel ply formed with the glass fabric shown in FIG. 4 was used to prepare the bonding surface on one of the prepregs. FIGS. 7A and 7B show the cohesive failure condition after $G_{1c}$ testing of the co-bonded prepregs.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "approximately" or 'about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to approximately 25 wt %, or, more specifically, approximately 5 wt % to approximately 20 wt %", is inclusive of the endpoints and all intermediate values of the ranges of "approximately 5 wt % to approximately 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A peel ply system for surface preparation of various composite substrates, said system comprising:
   (a) a composite substrate comprising reinforcing fibers impregnated with a cured, first resin matrix; and
   (b) a removable, resin-rich peel ply adhered to a surface of the composite substrate, said peel ply comprising a woven fabric impregnated with a cured, second resin matrix different from the first resin matrix, whereby, upon manual removal of the peel ply from the composite substrate's surface, a thin film of the second resin matrix remains on the composite substrate's surface to provide a bondable surface capable of co-bonding and secondary bonding with another composite substrate, wherein said second resin matrix is formed from a resin composition comprising:
at least one epoxidized novolac resin having epoxy functionality of at least 2;
di-functional epoxy resin selected from diglycidyl ethers of polyhydric phenols;
tri-functional epoxy resin selected from triglycidyl ethers of aminophenols;
a curing agent; and
inorganic filler particles;
wherein said peel ply has a resin content of at least 20% by weight based on the total weight of the peel ply, and
wherein said woven fabric comprises a plurality of yarns woven in a weaving pattern, said yarns having warp tensile strength of ≥70 lbf/in, fill tensile strength of ≥40 lbf/in, warp linear mass density within the range of 50-250 deniers, and fill linear mass density within the range of 50-250 deniers.

2. The system of claim 1, wherein said yarns have warp tensile strength of ≥80 lbf/in, fill tensile strength of ≥50 lbf/in, warp linear mass density within the range of 70-230 deniers, and fill linear mass density within the range of 70-230 deniers.

3. The system of claim 1, wherein the remaining thin film of the second resin matrix has a thickness of about 2%-15% of the original thickness of the peel ply prior to removal.

4. The system of claim 1, wherein the resin composition comprises at least one epoxidized novolac resin represented by the following structure:

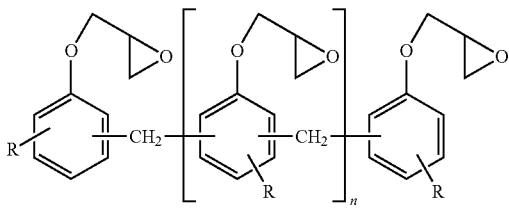

wherein n is an integer from 0 to 8, R=H or CH$_3$.

5. The system of claim 4, wherein the resin composition further comprises a dicyclopentadiene-containing novolac epoxy resin represented by the following structure:

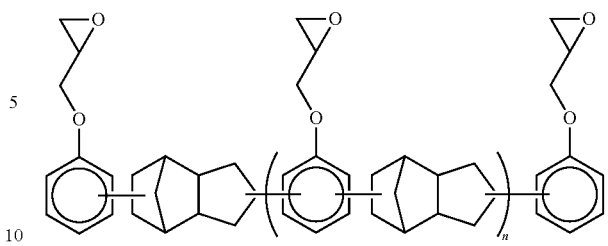

wherein n=an integer from 0 to 7.

6. The system of claim 1, wherein said woven fabric has a fabric weight within the range of 50-250 gsm.

7. The system of claim 6, wherein said woven fabric has a fabric weight within the range of 70-220 gsm.

8. The system of claim 1, wherein said woven fabric has a fabric thickness in the range of 50-250 μm.

9. The system of claim 8, wherein said woven fabric has a fabric thickness in the range of 100-200 μm.

10. The system of claim 1, wherein the yarns of the woven fabric are made of materials selected from the group consisting of: polyesters, polyethylene, polypropylene, nylon, elastomeric materials, polyaramids, polyimides, polyethyleneimine (PEI), polyoxazole, polybenzimidazole (PBI), polyether ether ketone (PEEK), and glass.

11. The system of claim 1, wherein said peel ply has a resin content within the range of 20%-50% by weight based on the total weight of the peel ply.

12. The system of claim 1, wherein said peel ply has a glass transition temperature ($T_g$) of ≥140° C.

13. The system of claim 12, wherein said peel ply has a glass transition temperature ($T_g$) within the range of 140° C.-200° C.

14. The system of claim 1, wherein the curing agent is selected from the group consisting of BF$_3$, BCl$_3$, and complexes thereof.

15. The system of claim 1, wherein said second resin matrix is formed from a resin composition comprising:
epoxy phenol novolac resin having epoxy functionality of at least 2;
dicyclopentadiene-containing epoxy novolac resin having epoxy functionality of at least 2;
diglycidyl ether of bisphenol A;
triglycidyl ether of aminophenol;
a curing agent selected from the group consisting of BF$_3$, BCl$_3$, and complexes thereof; and
fumed silica.

16. The system of claim 1, wherein the novolac resins are making up at least 20% by weight based on the total weight of the composition.

* * * * *